Patented July 21, 1925.

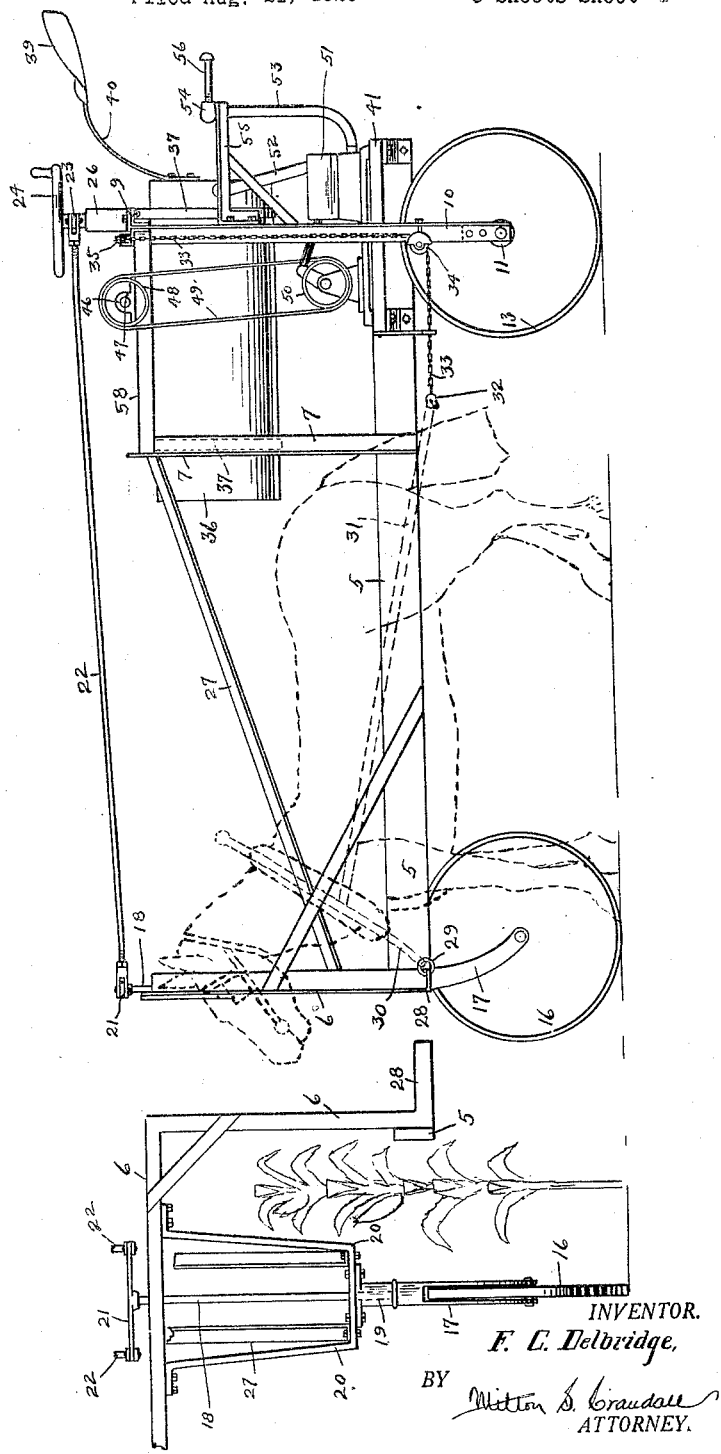

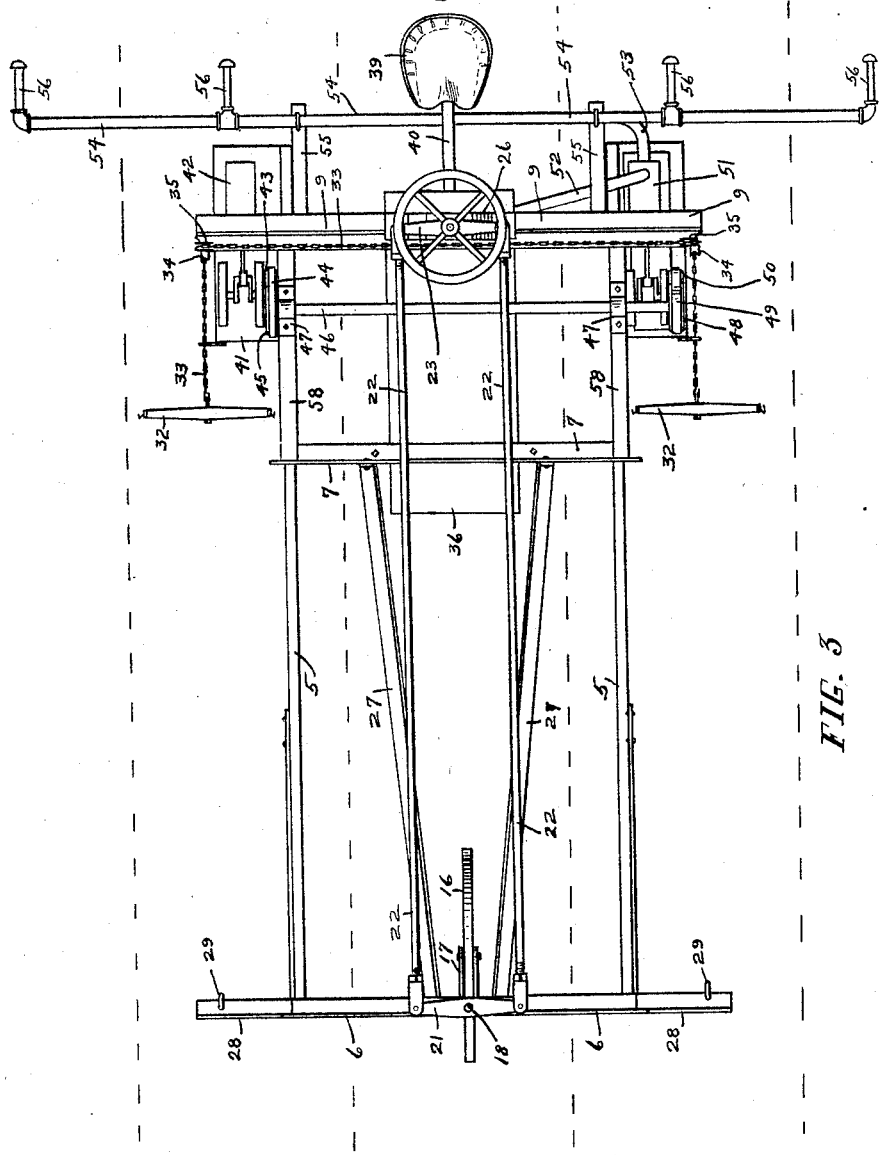

1,546,631

UNITED STATES PATENT OFFICE.

FRED C. DELBRIDGE, OF PROVIDENCE TOWNSHIP, BUENA VISTA COUNTY, IOWA.

SPRAYING-MACHINE VEHICLE.

Application filed August 21, 1923. Serial No. 658,498.

*To all whom it may concern:*

Be it known that I, FRED C. DELBRIDGE, a citizen of the United States, and a resident of Providence Township, Buena Vista County, Iowa, have invented certain new and useful Improvements in Spraying-Machine Vehicles, of which the following is a specification.

My present invention relates to a spraying device and has for its primary object the production of an improved traveling machine for spraying corn, potatoes, cabbage, tomatoes, tobacco, cotton and in fact any and all plants which grow in spaced rows and which it is necessary or desirable to spray either with water for irrigation, or with a solution to eradicate worms and insects.

A further object of the invention is the production of a machine for this purpose which is comparatively simple and inexpensive in construction and is so constructed as to travel between the rows of plants without injury to the plants and spray a maximum number of the rows.

Furthermore, the invention contemplates a machine of this class drawn by animals positioned on opposite sides of the machine and attached separately to draft rigging at the rear of the machine.

Still another object of the invention is the production in a spraying machine drawn by animals positioned on opposite sides of the machine and separately attached to the rear of the machine of improved draft equalizing means.

Furthermore, the invention has for an object the production of a spraying machine embodying certain novel features of construction and arrangements of parts, particularly adapting it for traveling between rows of corn or other tall growing plants without injury to the plants, such machine being drawn by animals positioned on opposite sides of the machine, and having a dirigible front wheel.

These and other objects and advantages I successfully attain in the embodiment hereinafter described, defined in the appended claims and illustrated in the accompanying drawings which form a part of this application and in which like characters of reference indicate corresponding parts throughout the several views, of which:

Fig. 1 is a side elevation of a machine constructed in accordance with my invention;

Fig. 2 is a fragmentary front elevation of the front part of the machine;

Fig. 3 is a plan of the machine; and

Figure 4:
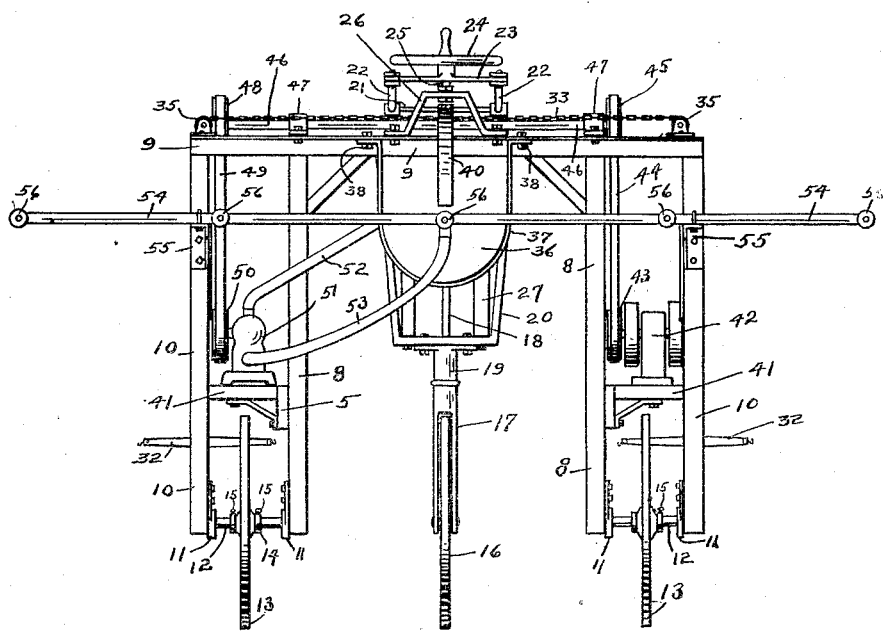
Fig. 4 is a rear elevation thereof.

Referring now to the illustrations, the main frame embodies preferably two longitudinal side members, 5, and arched front cross member 6 secured to the front end portions of the frame members 5 and sufficiently high to pass freely over the corn or other plants. A similarly arched, cross member, 7, is secured to the intermediate portions of the side members 5 and at the rear end is provided an arched cross member consisting of upright members 8 secured to the adjacent sides of the members 5 and interconnected at their upper ends by a suitable cross member 9, the end portions of which overhang the uprights, 8, and from them depend uprights 10. The uprights, 8 and 10, depend a distance below the plane of the longitudinal members 5 and have on their adjacent sides suitable bearings 11, in which are journaled shafts 12, having fixed thereon travel wheels, 13, adjustable longitudinally of the said shafts to suit the spaces between the rows of plants, as by providing on the shafts, 12, on opposite sides of the wheels, collars, 14, adjustably fixed on the shafts by set-screws, 15.

The front of the machine is preferably supported by means of a central dirigible wheel, 16, rotating in a fork, 17, having a steering post, 18, journaled in an elongated bearing 19, resting on the head of the fork, 17, and fixed on a U-shaped frame, 20, depending from the intermediate position of the top of the arched frame member 6, the said post, 18, being extended through the top of the said arched frame member and provided with a cross arm, 21, connected by links, 22, with a cross arm, 23, on the hub of a steering wheel, 24, rotating on a spindle, 25, carried by a suitable support, 26, on the rear frame member, 9.

The U-shaped frame member is held rigidly in place by suitable braces, 27, secured to the web of the said U-shaped frame and the intermediate cross member, 7, of the main frame.

The main frame is so constructed and the three travel wheels are so mounted, positioned and related, that they travel, respectively in the three spaces between four rows of plants. That is,—the center or front wheel travels in the center one of said spaces, while the rear wheels travel in the outer spaces, as will be clearly understood from Fig. 3, the rows being represented by the broken lines; and the arched main frame members are of sufficient height and width to freely pass over the two center rows, perhaps best understood from Fig. 2.

The device is designed to be drawn by two animals positioned on opposite sides of the machine to travel in the outer spaces between the rows or those traveled by the rear wheels, 13. In the embodiment chosen for illustration, the lower ends of the front arched cross members, 6, are extended laterally, as at 28, thus providing arms, in which are fixed rings, 29, to which the hame straps, 30, of the harness are fixed; and the tugs, 31, of the harness are secured to single-trees, 32, secured, respectively, to the ends of a chain or other suitable flexible element 33, which passes around guide pulleys, 34, on the lower portions of the frame members, 10, and over guide pulleys, 35, on the top of the rear arched cross member or the element, 9, by virtue of which construction the draft is equalized between the animals.

The center of the rear of the main frame carries a suitable liquid supply tank, 36, which preferably hangs in suitable bands, 37, secured to the intermediate portions of the cross members of the said arched frame members, by bolts 38, whereby the tank, 36, may be adjusted forwardly and rearwardly.

The rear of the machine is provided with a driver's seat, 39, positioned for convenient operation of the steering wheel 24, the driving of the draft animals, and general supervision of the machine. In the present instance the seat is mounted on a bracket, 40, on the rear end of the tank, 36. Above the travel wheels, 13, and between the frame members, 8 and 10, are mounted suitable platforms or supporting elements 41, on one of which is mounted a suitable motor, 42, having its drive pulley, 43, connected by a belt, 44, with a pulley, 45, fixed on a shaft, 46, which extends across the top of the main frame and is journaled in suitable bearings, 47, on longitudinal frame members, 58, interconnecting the tops of the intermediate and rear arched frame members; and carrying at its other end a pulley, 48, connected by a belt, 49, with a pulley, 50, driving a suitable pump, 51, mounted on the other one of the supports, 41, and receiving liquid from the tank, 36, through a suitable duct, 52, and adapted to force the liquid through a tube, 53, to an ejector, which in the present instance is a transverse spraying boom, 54, mounted on suitable brackets, 55, on the rear of the main frame; and provided at spaced intervals with suitable spraying nozzles, 56, positioned approximately in the center of the spaces between the rows of plants.

The presence of the center wheel is sometimes arbitrary and may be removed, as when the plants are small, in which case the front of the machine is supported by the animals, hitched as described, the greater weight of the front of the machine being counterbalanced by the weight of the driver and the devices and appurtenances on the rear of the machine, and if desired to further counterbalance the weight of the front of the machine, the supporting bands of the tank may be loosened and the tank shifted rearwardly.

By removing the pipes, 54, and substituting suitable dusting apparatus, the vehicle may be used for dusting insecticide in powdered form upon the plants.

Although I have illustrated and herein described but one embodiment of the invention, I would not be understood as being limited to such specific construction, for various alterations and modifications may be made in the details of construction and arrangement of parts herein disclosed without departing from the spirit and scope of the invention as defined in the appended claims: to wit, 1. A machine of the class described including longitudinal side members, a rear vertically-arched transverse member having vertical arms spaced laterally beyond the side members on either side of the machine, travel wheels supported on said vertical arms, draft rigging on said arms to which draft animals positioned outside of the longitudinal side members may be hitched, a front arched transverse member having lateral arms to which the supporting neck harness of said animals may be hitched, and a dirigible wheel supporting the forward ends of the longitudinal side members.

2. In a spraying machine vehicle adapted to straddle two inner rows of a group of four or more rows of plants, a pair of longitudinal side members spaced to just clear the two rows, front and rear vertically-arched transverse members positioned to straddle the two rows, draft connections on the rear transverse member positioned for harnessing to draft animals positioned between the horizontal side members and the respective adjacent rows constituting the outer rows of the aforesaid group of rows, and a dirigible wheel supporting the forward end of the vehicle.

In testimony whereof, I have hereunto set my hand this 17th day of August, 1923.

FRED C. DELBRIDGE.